United States Patent [19]
Rabasse

[11] 3,870,969

[45] Mar. 11, 1975

[54] DIGITAL LOGIC FREQUENCY CONTROL LOOP FOR MULTIVIBRATOR COMPOSED OF TWO MONOSTABLE ELEMENTS

[75] Inventor: Jean Rabasse, Breuillet, France

[73] Assignee: Compagnie Industrielle des Telecommunications Cit-Alcatel, Paris, France

[22] Filed: Nov. 23, 1973

[21] Appl. No.: 418,173

[30] Foreign Application Priority Data

Nov. 22, 1972 France .............................. 72.41470

[52] U.S. Cl. ...................... 331/1 A, 331/25, 331/34, 331/145

[51] Int. Cl. ............................................ H03b 3/04

[58] Field of Search ......... 331/1 A, 18, 25, 34, 144, 331/145, 113 R

[56] References Cited

UNITED STATES PATENTS 3,164,777 1/1965 Guanella .......................... 331/18 X 3,376,517 4/1968 Reynolds ........................ 331/1 A X

*Primary Examiner*—Siegfried H. Grimm

*Attorney, Agent, or Firm*—Craig & Antonelli

[57] ABSTRACT

Servo-controlled frequency multivibrator composed of two monostable elements looped together comprising a first and second digital element controlling respectively a first and second logic gate ensuring in the one case the synchronous starting of the multivibrator on the pilot frequency F and in the other case the blocking thereof and a servo-control regulating circuit for the polarization voltage of the monostable elements, sensitive to the comparison between the end of the $m^{th}$ pulse having a frequency F and of the $n^{th}$ pulse having a frequency of f of the multivibrator, $m$ and n being chosen so that $m/F = n/f$.

8 Claims, 3 Drawing Figures

Figure 1:
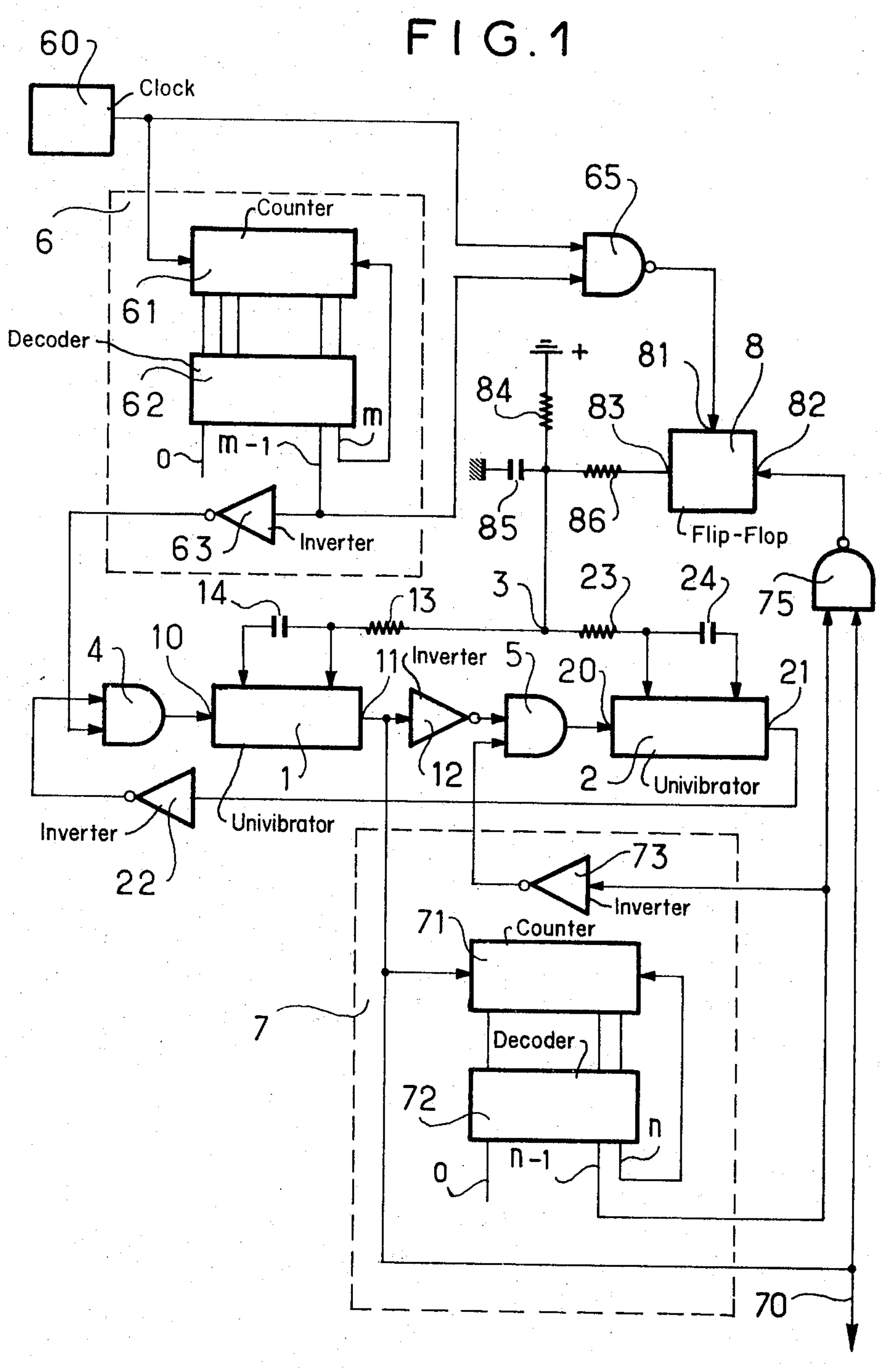

DIGITAL LOGIC FREQUENCY CONTROL LOOP FOR MULTIVIBRATOR COMPOSED OF TWO MONOSTABLE ELEMENTS

The present invention comes within the branch of multivibrators constituted by two univibrators of the "monostable" type connected upon mutual reaction.

In such a multivibrator circuit, it is known that any adding or subtracting modification of the control voltage of the monostable elements makes the frequency of the multivibrator increase or decrease.

It is also a known feature, in such a multivibrator circuit, to make its operation synchronized by application, at the input of one of the monostable elements and simultaneously with the output signal of the second monostable element, of an outside signal ensuring the blocking thereof as long as it is at a first logic value and enabling the oscillations when it is at a second logic value.

The aim of the present invention is, starting from these known techniques, to enable the servo controlling of the frequency, which is f and of the phase of a multivibrator at a pilot frequency, which is F, by means of a digital control element.

The present invention has for its object a servo-controlled frequency multivibrator comprising a first and second univibrator of the "monostable" type looped together by connections, on the one hand, between an output of the first and the input of the second and, on the other hand, between an output of the second and the input of the first and comprising a first logic gate arranged on the connection between the said first and second monostable elements and liable to receive an outside signal for its blocking control, characterized in that it comprises, moreover, a second logic gate interposed on the connection between the said second and first monostable elements, a clock sending out pilot frequency pulses, a first digital element for counting m successive clock pulses ensuring the controlling of the said second logic gate, a second digital element for counting n successive pulses of the said multivibrator ensuring the controlling of the said first logic gate by the inserting of the said outside signal, the numbers m and n being selected so that the duration of n pulses of the multivibrator be equal to that of m clock pulses and a control element for the servo controlling of the frequency of the said multivibrator having two inputs receiving, respectively, the clock pulse whose order is m counted and the pulse of the multivibrator whose order is n counted and working out an error voltage applied as a correction of the frequency of the multivibrator.

The present invention is therefore based on the fact that the servo controlling of a frequency $f$ by a frequency F is ensured by the detecting of m periods of the frequency F and n periods of the frequency $f$, $m$ and n being integers such that $n/f = m/F = \theta$, $\theta$ being the constant duration of the cycle of the system.

Figure 2:
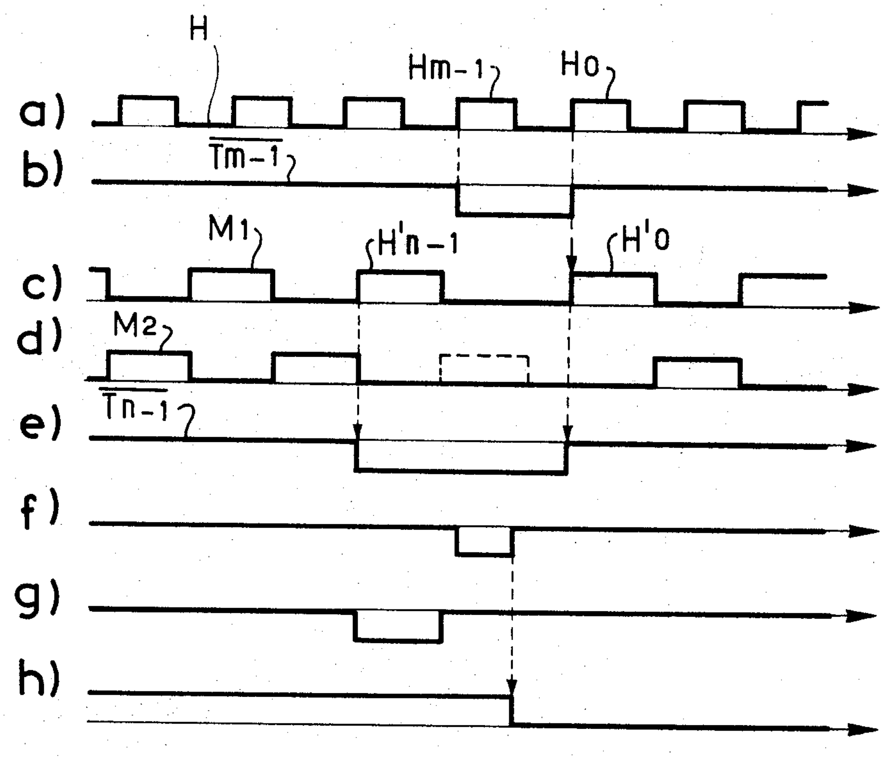
Figure 3:
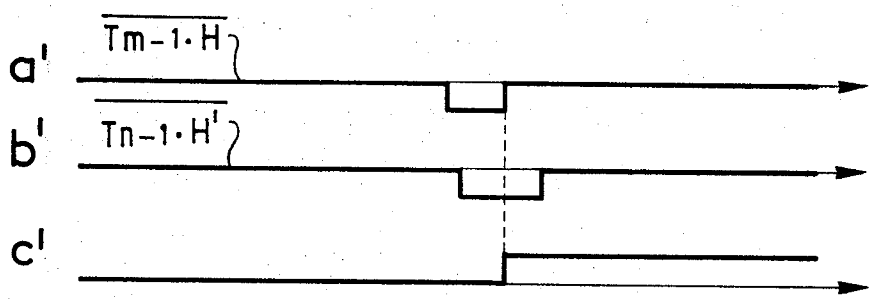

Other characteristics and advantages of the present invention will become apparent from the description given herebelow with reference to the accompanying drawing in which:

FIG. 1 shows an embodiment of the servo-controlled frequency multivibrator according to the invention; and FIGS. 2 and 3 are diagrams explaining the operation of the multivibrator according to FIG. 1.

FIG. 1 shows, by way of example, an embodiment of that servo-controlled frequency multivibrator. It comprises two univibrators of the "monostable" type 1 and 2 which are looped together, the direct output 11 of the monostable element 1 energizing, through an inverter 12 and an AND gate 5, the input 20 of the monostable element 2 and likewise the direct output 21 of the monostable element 2 energizing, through an inverter 22 and an AND gate 4, the input 10 of the monostable element 1.

The frequency $f$ of the mulitvibrator thus constituted is adjustable by the polarization voltage, or control voltage, at 3, applied to each of the monostable elements 1 and 2 through networks of the RC type, 13–14 and 23–24. In that embodiment, that polarization voltage is common and the values of the networks RC 13–14 and 23–24 are selected indentical in order to obtain symmetrical signals.

On each of the connections between the monostable elements, a logic AND gate 4 or 5 is interposed following the inverter 22 or 12. An input of the AND gate 4 is connected to the output of the inverter 22 whereas its output is connected to the input 10 of the monostable element 1. An input of the AND gate 5 is connected to the output of the inverter 12, the output of that gate is connected to the input 20 of the monostable element 2.

Each of the second inputs of the logic AND gates 4 and 5 is connected to an element 6 or 7 of digital type. These digital elements 6 and 7 are intended to ensure the servo controlling of the frequency, which is $f$, and of the phase of the multivibrator constituted by the two monostable elements 1 and 2 which are looped together, by a frequency called the pilot frequency, which is F.

A master clock 60 sends out pulses at that frequency F. The digital element 6 comprises a counter 61 connected to the master clock 60. It ensures the counting of the pulses whose frequency is F. A decoder 62 connected to the counter 61 supplies on its respective outputs signals corresponding to the counting instants of the pulses from the clock 60 received by the counter 61.

The multivibrator is intended for constituting a clock sending out pulses whose frequency is f servo controlled by the frequency F. On one output 70 of the multivibrator, formed by the output 11 of the monostable element 1, the pulses whose frequency is $f$ will be sent out.

The digital element 7 comprises a counter 71 connected to the output 11 of the monostable element 1. It ensures the counting of the pulses which it receives. A decoder 72 connected to the counter 71 supplies at its respective outputs signals corresponding to the counting instants for the pulses coming from the monostable element 1.

The signals appearing at the output whose order is m of the decoder 62 and on the output whose order is n of the decoder 72, the whole numbers m and n being selected so that $m$ pulses whose frequency is F have a duration identical to n pulses whose frequency is $f$, ensure respectively, the controlling of the gates 4 and 5. The output whose order is $m$-1 of the decoder 62 is connected up through an inverter 63 to the second input of the AND gate 4. The output whose order is $n$-1 of the decoder 72 is connected up through an inverter 73 to the second input of the AND gate 5. Moreover, the output whose order is *m* of the decoder 62 is connected up by a reset-to-zero connection to the counter with a view to ensuring the resetting to zero thereof and hence the grouping of the pulses of the clock 60 into cycles of *m* pulses each. In a like manner, the output whose order is n of the decoder 72 is connected to the counter 71 to ensure the resetting to zero thereof and thus to enable the grouping of the pulses whose frequency is f coming from the multivibrator 1–2 in cycles of *n* pulses each.

The outputs of the decoder 62 are designated by 0 . . . . . *m* - 1, *m;* those of the decoder 72 are designated by 0 . . . . . *n* - 1, *n*.

A bistable flip-flop 8 inserted in the aforementioned circuitry ensures the detection of the error in the servo controlling of the frequency *f* by the frequency F. A first input 81 of that flip-flop 8 is connected to the output of a logic AND-NOR gate 65 a first of whose inputs is connected to the output of the clock 60 and a second of whose inputs is connected to the output whose order is *m* - 1 of the decoder 62. A second input 82 of that flip-flop 8 is connected to the output of a logic AND-NOR gate 75 a first of whose inputs is connected to the output 11 of the monostable element 1 and a second of whose inputs is connected to the output whose order is *n* - 1 of the decoder 72. The reverse output designated by 83 of that flip-flop is connected to an integrator network of the RC type, 84–85 through a resistor 86. The connection of that network 84–85 and of the resistor 86 forms the point 3 for the control of polarization of the monostable elements 1 and 2. That integrating network enables a modification in the polarization voltage of the monostable elements which controls the frequency *f* of the multivibrator to be ensured.

The operation of that multivibrator whose frequency is f and phase are servo controlled by the frequency F is explained with reference to FIG. 1 and the diagrams in FIGS. 2 and 3.

FIG. 2 shows, in the period *t*, the signals at the output of various elements in FIG. 1, in the case where the frequency *f* of the multivibrator, servo controlled in a given ratio by the pilot frequency F, is too high.

The diagram shows the pulses H whose frequency is F sent out by the clock 60. The pulse Hm-1 received by the counter 61 and the pulse Ho (or Hm causing the resetting to zero of the counter 61) has been referenced therein.

Diagram b shows the signal $\overline{T\ m\text{-}1}$ sent out at the output of the inverter 63 connected to the output *m*-1 of the decoder 62. Diagrams *c* and *d* show the pulses M1 and M2 whose frequency is *f* on the outputs 11 and 21 of the monostable elements 1 and 2. The pulses M1 are those received by the counter 71; the pulse H′ *n*-1 and the pulse H′*o* (or H*n* causing the resetting to zero of the counter 71) have been referenced. Diagram *e* shows the pulse $\overline{T\ n\text{-}1}$ sent out by the inverter 73 connected to the output *n*-1 of the decoder 72.

As long as the signals $\overline{T\ m\text{-}1}$ and $\overline{T\ n\text{-}1}$ are at a logic value 1, and AND gates 4 and 5 are conductive for the signals which they receive respectively from the monostable elements 2 and 1. The signal $\overline{T\ n\text{-}1}$ assuming here the first logic value o on the arrival of the $(n\text{-}1)^{th}$ pulse coming from the monostable element 1, that signal $\overline{T\ n\text{-}1}$ = o comes and blocks the AND gate 5, the monostable element 2 remains blocked at the end of the period of the monostable element 1, the pulse which should appear at the output of the monostable element 2 in the absence of the signal $\overline{T\ n\text{-}1}$ = o is represented by discontinuous lines in diagram d. The multivibrator stops as soon as the output 11 of the monostable element 1 has returned to zero, this occurring therefore at the end of a cycle of n pulses having a frequency of *f*. That AND gate 5 has, as its function, the stopping of the multivibrator at the end of its cycle of n pulses when the frequency of the multivibrator is too high. At the instant of the synchronous starting of the multivibrator on the frequency F for a new cycle of n pulses whose frequency is *f*, the AND gate 4 is conductive the counter 71 advances by one order and sets the signal $\overline{T\ n\text{-}1}$ to the logic value 1 making the AND gate 5 conductive for the pulses coming from the monostable element 1. The multivibrator assembly resumes its normal operation.

The synchronous starting of the multivibrator whose frequency is *f* on the frequency F is ensured by means of the control by the signal $\overline{T\ m\text{-}1}$ of the AND gate 4. When that signal $\overline{T\ m\text{-}1}$ assumes the logic value o, the monostable element 1 is stopped (if it was not stopped already as in the example of operation taken in the case of the diagrams in FIG. 2) and the multivibrator stops then as soon as the output of the monostable element 2 is at o. The passing of the signal $\overline{T\ m\text{-}1}$ having the logic value o to the logic value 1 acts as a signal for tripping the monostable element 1. The AND gate 4 enables the synchronous starting of the pulses whose frequencies are F and *f*.

Diagram f shows the signal $\overline{T\ m\text{-}1.\ H}$ sent out by the AND-NOR gate 65 whereas diagram g represents the signal $\overline{T\ n\text{-}1.\ H'}$ sent out at the output of the AND-NOR gate 75, H being the clock pulses whose pilot frequency is F (diagram *a*), H′ being the pulses M1 sent out by the monostable element 1 (diagram *c*).

These AND-NOR gates 65 and 75 ensure the controlling of the flip-flop 8. The signal $\overline{T\ m\text{-}1.\ H}$ is present at the input 81 of the flip-flop 8, whereas the signal $\overline{T\ n\text{-}1.\ H'}$ is present at the input 82 of that flip-flop 8. The controlling of the flip-flop is effected by the rising wave front of the signal $\overline{T\ m\text{-}1.\ H}$ taking into account the value of the signal $\overline{T\ n\text{-}1.\ H'}$.

$\overline{T\ n\text{-}1.\ H'}$ is already in the state 1 when the rising wave front of the signal $\overline{T\ m\text{-}1.\ H}$ arrives, the frequency *f* of the multivibrator is too high. The voltage of the reverse output 83 of the flip-flop 8 will be set to the state zero (diagram *h*) under the effect of the rising wave front of $\overline{T\ m\text{-}1.\ H}$ for the whole duration of the following cycle, that is, the duration of *m* pulses whose frequency is F. That voltage applied to the integrator network 84, 85 through the resistor 86, causes the discharge of the capacitor 85. The voltage for the controlling of the monostable elements at the point 3 decreases and will make the frequency *f* of the multivibrator decrease.

FIG. 3 shows, in the period *t*, signals corresponding to the case where the frequency *f* is too low, this being shown by the arrival of the rising wave front of the signal $\overline{T\ m\text{-}1.\ H}$ (diagram *a′*) whereas the signal $\overline{T\ n\text{-}1.\ H'}$ is still in the state o (diagram *b′*). In relation to the case of diagrams *f* and *g* in FIG. 2, the error has changed signs and the reverse output 83 of the flip-flop 8 passes to the state 1 (diagram *c′*). Consequently, the capacitor 85 becomes charged, causing an increase in the voltage for controlling the monostable elements. The frequency of the multivibrator will increase to compensate that new deviation.

According to the relative positions in time of the rising wave fronts of the two signals $\overline{T\ m\text{-}1.\ H}$ and $\overline{T\ n\text{-}1.\ H'}$ compared, the flip-flop 8 will assume, throughout the duration of a whole cycle of the master clock, which is m pulses whose frequency is F, the logic state o or 1.

Such successive corrections reduce the difference between the positions of the wave fronts of the signals T *m*-1. H and T *n*-1. H' compared and tend to make it negligible.

The circuitry which has just been described enables the "interlocking" of two clock frequencies, supplying in the same period respectively cycles of *m* and *n* periods, with synchronous beginnings of cycles, a coincidence of ends of cycles and a hold of coupling for great differences in frequencies by error detection between the end of the $n^{th}$ pulse of the slave clock formed by the multivibrator and the end of the $m^{th}$ pulse of the master clock and correction, by a supplied error voltage, of the slave frequency. It enables the ratio *f*/F to be kept constant.

The device described above may be applied more particularly to the reintroducing of words extracted from a PCM frame in that same frame after processing of those words, for example for the passing from a compression law coding (8 bits) to a linear coding (12 bits).

What is claimed is:

1. A frequency controlled multivibrator comprising a first and a second univibrator of the monostable type, a first logic gate connected between the output of said first univibrator and the input of said second univibrator, a second logic gate connected between the output of said second univibrator and the input of said first univibrator, a clock generating a pilot frequency signal, first digital means connected between the output of said clock and said second logic gate for providing an output pulse for each m clock pulses received, second digital means connected between the output of said first univibrator and said first logic gate for providing an output pulse for each n pulses received from said first univibrator, the time duration of n pulses from said first univibrator being equal to the time duration of m clock pulses, control means responsive to the output pulses of said first and second digital means for generating an error voltage, and adjusting means responsive to said error voltage for adjusting the frequency of said first and second univibrators.

2. A frequency controlled multivibrator as defined in claim 1 wherein said control means includes a flip-flop having respective inputs receiving the output pulses of said first and second digital means and an output which is set to one of the logic states 0 and 1 according to the direction of the deviation between the trailing edges of the applied pulses.

3. A frequency controlled multivibrator as defined in claim 2 wherein said adjusting means includes an integrator circuit of the RC type connected to the output of said flip-flop and to a frequency control terminal for a least one of said univibrators.

4. A frequency controlled multivibrator as defined in claim 3 wherein each of said fist and second digital means comprises a counter and a decoder connected to said counter.

5. A frequency controlled multivibrator as defined in claim 4 wherein each of said counters is of the cyclic type, the decoder of said first digital means having its output m connected to reset the counter to which it is connected and its output m-1 connected to said second logic gate, the decoder of said second digital means having its output n connected to reset the counter to which it is connected and its output n-1 connected to said first logic gate.

6. A frequency controlled multivibrator as defined in claim 5 wherein a first AND-NOR gate has one input connected to the m-1 output of the decoder in said first digital means, a second input connected to the output of said clock and an output connected to one input of said flip-flop, and a second AND-NOR gate has one input connected to the *n*-1 output of the decoder in said second digital means, a second input connected to the output of said first univibrator and an output connected to the other input of said flip-flop.

7. A frequency controlled multivibrator as defined in claim 6 wherein said first and second logic gates are AND gates.

8. A frequency controlled multivibrator as defined in claim 6 wherein a first inverter is connected between the output of said first univibrator and an input of said first logic gate, and a second inverter is connected between the output of said second univibrator and an input of said second logic gate.

* * * * *